United States Patent [19]

Nakajima

[11] Patent Number: 4,591,921

[45] Date of Patent: May 27, 1986

[54] FACSIMILE DEVICE

[75] Inventor: Toshifumi Nakajima, Kawasaki, Japan

[73] Assignee: Canon Kabushiki Kaisha, Tokyo, Japan

[21] Appl. No.: 516,441

[22] Filed: Jul. 22, 1983

[30] Foreign Application Priority Data

Aug. 5, 1982 [JP] Japan .................... 57-135756

[51] Int. Cl.[4] ........................................... H04N 1/32
[52] U.S. Cl. .................... 358/257; 358/296; 355/133
[58] Field of Search ............ 358/256, 257, 296, 258; 340/715; 355/133

[56] References Cited

U.S. PATENT DOCUMENTS 4,224,641 9/1980 Kanda ........................ 358/257
4,380,772 4/1983 Italiano ...................... 346/140 PD

*Primary Examiner*—Edward L. Coles, Sr.
*Attorney, Agent, or Firm*—Fitzpatrick, Cella, Harper & Scinto

[57] ABSTRACT

A facsimile device for recording contents of an erroneous operation done by an operator or of trouble which has taken place during the image transmission with use of a recording unit to carry out the recording operation, thereby making it possible to dispense with a display unit for displaying the erroneous operation and trouble in the image transmission. Such construction of the facsimile device contributes to its structural simplification, saving of electric power to drive the display unit, and possible exhibition of various sorts of content to be displayed.

8 Claims, 3 Drawing Figures

FACSIMILE DEVICE

BACKGROUND OF THE INVENTION

1. Field of the Invention

This invention relates to a device for displaying contents of various errors which may occur during operations of a transmission system and transmission of images by such system. More particularly, it is concerned with a facsimile device, in which an image recording element is used for error displaying purposes.

2. Description of the Prior Art

This kind of facsimile device has so far been classified generally into a high grade machine and a common grade machine. The high grade machine incorporates in its operational panel an exclusive error display element made up of a light emitting diode (LED), liquid crystal, or the like, with which erroneous operations done by an operator of the machine are displayed on the element. Even such a high grade facsimile device provided with such an exclusive error display device, however, could not indicate the nature of a machine stoppage during image transmission for the reason that the display element is costly and needs much power to keep itself on even after the machine has stopped its operation. On the other hand, the common grade facsimile machine has only a simplified display device, or none. Such display device, if any, has been limited to a simple indication of "ERROR", "NO PAPER", etc. by means of an LED, etc.

SUMMARY OF THE INVENTION

It is therefore the primary object of the present invention to provide a facsimile device, in which a recording element is used not only for recording images to be transmitted, but also for recording and displaying the contents of various extraordinary conditions such as errors occurring during the transmission operations.

It is another object of the present invention to provide a facsimile device, in which a display member on the operating panel is reduced to a simplified structure.

It is another object of the present invention to provide a facsimile device, in which electric power required for the error display is reduced to the minimum necessary amount.

It is still another object of the present invention to provide a facsimile device capable of distinguishing between the necessity and non-necessity of the error display by change-over operation of a switch, thereby making it possible to display such errors only when necessary.

The foregoing and other objects as well as specific constructions and operations of the error display device for the facsimile device according to the present invention will become more apparent and understandable from the following detailed description thereof, when read in conjunction with the accompanying drawing.

DETAILED DESCRIPTION OF THE PREFERRED EMBODIMENTS

Figure 1:
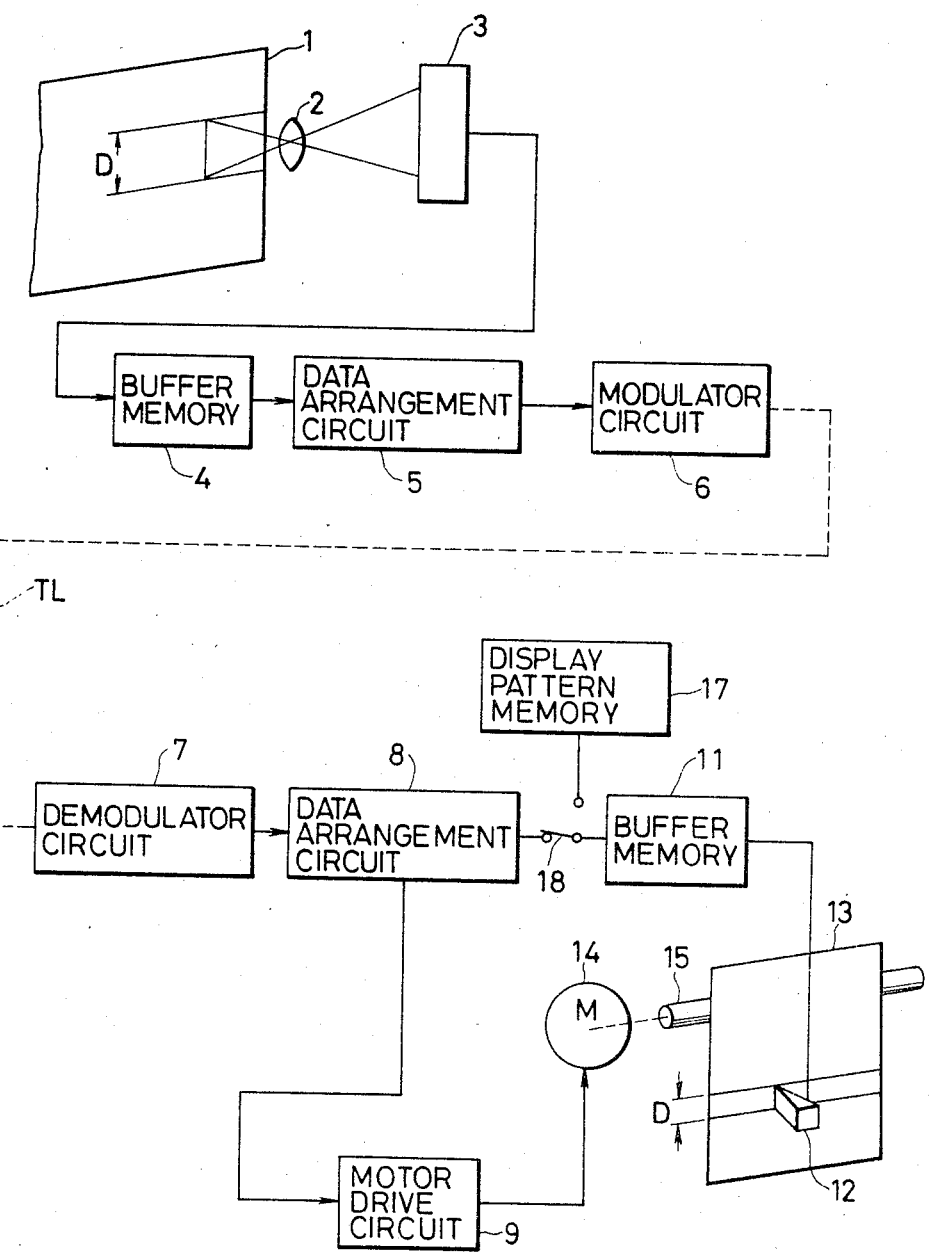
FIG. 1 is a schematic block diagram showing an overall construction of one embodiment of a facsimile device according to the present invention.
Figure 2:
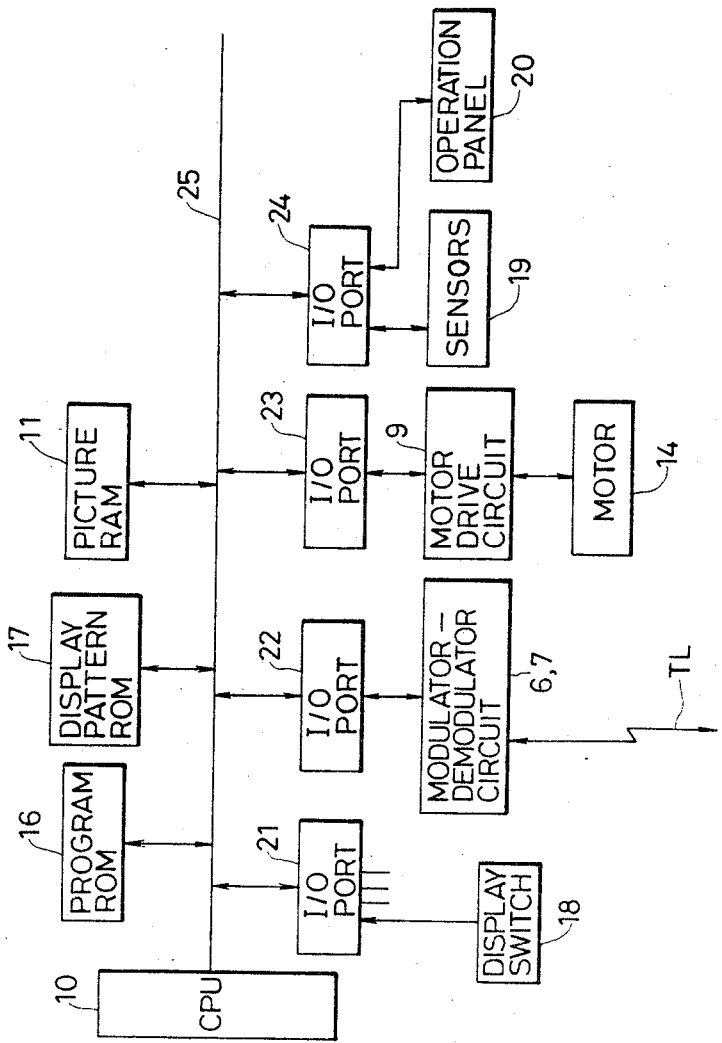
FIG. 2 is a block diagram showing electrical circuitry of a facsimile device according to the present invention.
Figure 3:
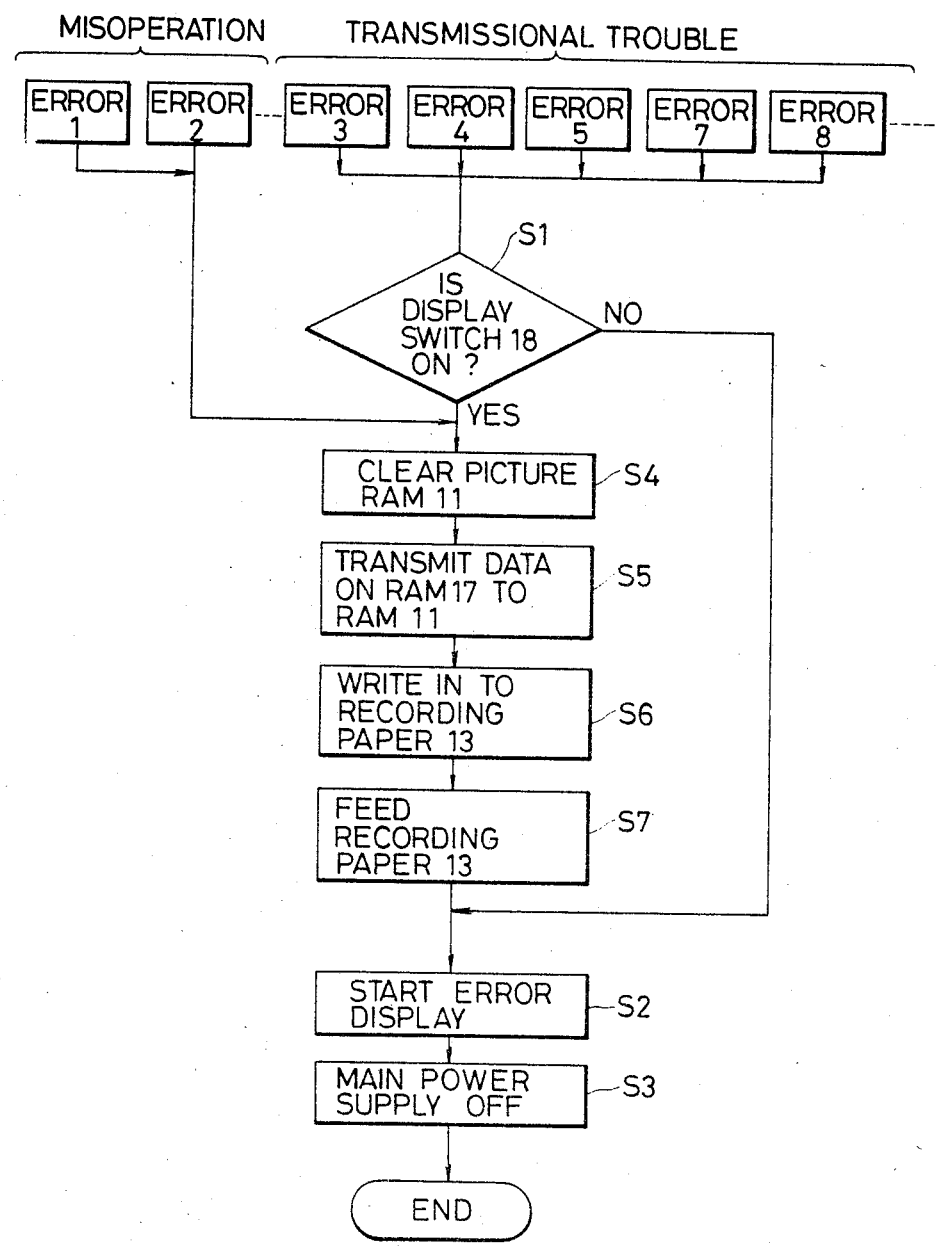
FIG. 3 is a flow-chart showing one example of the sequence control related to the error display portion of a facsimile device according to the present invention.

Referring now to FIGS. 1 to 3 illustrating one embodiment of the facsimile device according to the present invention, a region having a width D on an image original 1 is read by a lens system 2 and a solid-state image scanning element 3, as shown in FIG. 1. The image information as read out is once stored in a buffer memory 4. Thereafter, the stored image information is read out of the memory, and re-arranged in and by a data arrangement circuit 5, followed by demodulation of the same with a modulator/demodulator circuit 6 (in the illustrated embodiment, it is used as the modulator circuit) and transmission of the modulated image data to a receiving facsimile device through a public telephone line TL.

The receiving facsimile device forwards the data demodulated by a modulator/demodulator circuit 7 (in this particular embodiment, it is used as the demodulator) to a data arrangement circuit 8, and counts the line number of the received signals to thereby control a motor drive circuit 9.

The data arrangement circuits 5 and 8 are constructed with a micro-computer (CPU) 10 and a part of a picture RAM (buffer memory) 11 as shown, for example, in FIG. 2.

The data which have been re-arranged in the data arrangement circuit 8 are stored in the buffer memory 11 and a certain definite quantity of the data is stored in it. Then, this certain definite quantity of data is fed to a recording element 12 to record the width D of the image original onto recording sheet 13, a motor 14 is driven by the motor drive circuit 9, and a paper feeding roller 15 is rotated by the driving force transmitted from the motor 14 to bring the subsequent recording position on the recording sheet to the position of the recording element 12. The transmission of the image informations is carried out by repetition of the abovementioned operations.

In the following, further details of the electric circuitry for a facsimile device according to the present invention will be explained with reference to FIG. 2.

In the drawing, a reference numeral 16 designates a read-only-memory (ROM) storing therein the control programs for the CPU 10; a numeral 17 refers to a read-only-memory (ROM) for display patterns storing therein display patterns for the error display; a numeral 18 refers to a display change-over switch to perform the change-over operations to select either recording of the display pattern in the display pattern ROM 17 on the recording sheet 13, or recording of ordinary image informations on the recording sheet 13; a reference numeral 19 denotes various sensors for extraordinary conditions such as erroneous operations, troubles in transmission, presence or absence of recording paper, and feeding conditions of the recording medium; a numeral 20 refers to an operational panel, in which various switches and display devices such as LED'S are arranged; 21 to 24 respectively refer to I/O ports; and 25 indicates a bus line for supply and receipt of signals.

When it becomes unable to continue transmission of the image information on the way of the repetitive transmission operations, as mentioned in the foregoing, the CPU 10 processes the sequence for the required transmission in accordance with any one of the causes for errors 1 and 2 based on erroneous operations and causes for transmission troubles 3 to 8 as shown, for example, in FIG. 3. After this, it shifts the sequence to processing of the error. In this case, the CPU 10 detects, at Step S1, the conditions of the display switch 18 through the I/O port 21. When the switch is in "off" condition, no display is made on the recording sheet 13, and the sequence proceeds to the Step S2 where the error display is made on the operating panel 20 by means of the LED or buzzer, and so on, after which the main power source is turned off at Step S3. It is also possible to implement the device so that such an error display is not made when the facsimile device is operated by a common user, but to show the cause of the trouble to repair-service personnel by rendering it to be in an "enabled" condition through the display switch 18 only when the trouble occurs and it is required to discover the cause for the trouble.

That is to say, when the display switch 18 is "on", the sequence proceeds from Step S1 to Step S4 where the image buffer memory 11 is cleared for the width D. Subsequently, at Step S5, the content of the display pattern memory 17 is transferred to the buffer memory 11. At Step S6, the transferred contents in the buffer memory are recorded on the recording sheet 13 in the same manner as if the image data were being recorded. Further, at Step S7, the recording sheet 13 is fed by means of the motor 14 and the paper feeding roller 15. After this, the sequence proceeds from Step S2 to Step S3, and the power source is turned off.

In the above-described instance, errors such as the image original for transmission not being perfectly set at its reading position and the original for transmission being too short to be forwarded are all caused by erroneous operations, which correspond to "ERROR 1" and "ERROR 2" in FIG. 3. These errors caused by the operator are displayed on the recording sheet 13 without regard to "on" and "off" of the display switch 18.

On the other hand, those troubles in transmission such that at least one of EOM signal, CFR2 signal, GI2 signal, etc. is not received correspond to "ERROR 3" to "ERROR 8" in FIG. 3.

Furthermore, when it is impossible, or at least inappropriate, to make an error display on the recording sheet 13 such as "no recording sheet", "imperfect feeding of recording sheet", "disorder in motor", and so forth, the sequence may be constructed in such a manner that no error display is made on the recording sheet 13, but such display is done on the operating panel 20 by means of the LED or buzzer.

In the above-described embodiment, when a sentence is to be displayed by use of characters and letters for the display pattern, the memory capacity of the ROM needs to be increased. It is therefore preferable that the kind of display on the recording paper 13 will be constructed with alpha-numeric symbols.

However, when the memory capacity of ROM can be increased as the result of reduction in price of the component, and for other reasons, it becomes, of course, possible to show the causes for the trouble and even the measures to be taken against such trouble in words on the recording sheet 13 to provide proper notice and directions to the operator or the repair-service personnel.

In the foregoing embodiment of the present invention, explanations have been given on a semi-multi type facsmilie device. However, the invention is not limited to this embodiment alone, but it can also be applied to a full-multi type facsmilie device.

Furthermore, the present embodiment is directed to a "G2" facsimile device, but it can also be applied to "G3" and "G1" facsimile devices.

As has been explained in the foregoing, the present invention is capable of displaying the content and kind of erroneous operations committed by the operator, to prompt him or her to be cautious not to repeat the same mistake. Moreover, since the present invention is able to display on the recording sheet the cause for and the diagnosis of the trouble simultaneously with such error display by interrupting transmission of the image informations through opening of the display switch, it makes it easier for the repair-service personnel to take whatever measures are necessary to repair the machine. In addition, even if the main power source is turned off after such error display, the display on the recording paper remains unerased, so that such display also contributes to saving power. Further, there is no necessity for providing a plurality of display elements on the operating panel for the display of the contents of the errors, the arrangement of the panel itself is simplified, which helps to locate the disordered portion of the machine at the time of the maintenance and repair services.

What is claimed is:

1. A facsimile apparatus, comprising:
   (a) memory means for storing therein a plurality of display patterns for contents of a plurality of extraordinary conditions;
   (b) detection means for detecting the extraordinary conditions;
   (c) recording means for recording received image information on a recording medium; and
   (d) control means for reading out of said memory means, upon detection of one of the plurality of the extraordinary conditions during data reception, one of the plurality of the display patterns corresponding to the detected extraordinary condition and recording the read display pattern on the recording medium.

2. A facsimile apparatus according to claim 1, further comprising a display panel, wherein said control means also displays the read display pattern on said display panel upon said detection.

3. A facsimile according to claim 2, further comprising a switch for determining whether the read display pattern should be both recorded on said recording medium and displayed on said display panel or the read display pattern should only be displayed on said display panel upon said detection.

4. A facsimile apparatus, comprising:
   (a) memory means for storing therein a plurality of display patterns for contents of erroneous operations and for contents of a plurality of extraordinary conditions;
   (b) means for detecting each of the extraordinary conditions;
   (c) recording means for recording received image information on a recording medium;
   (d) display means for displaying conditions of said facsimile apparatus;
   (e) manual selection switch means for selecting functions of said facsimile apparatus upon the occurrence of an extraordinary condition; and
   (f) control means for reading from said memory means, upon detection of one of the plurality of the extraordinary conditons during data reception, one of the plurality of the display patterns corresponding to the detected extraordinary condition, deciding in response to the facsimile apparatus function selected by said manual selection switch means whether or not the read display pattern should be recorded on said recording medium by said recording means, and controlling said display means to display the occurrence of the detected extraordinary condition irrespective of the facsimile apparatus function selected by said manual selection switch means.

5. A facsimile apparatus acording to claim 4, wherein when the detected extraordinary condition is due to said recording means, said control means controls only said display means to display the occurrence of the detected extraordinary condition.

6. A facsimile apparatus, comprising:
(a) memory means for storing therein a plurality of display patterns for contents of a plurality of first extraordinary conditions in which data recording on a recording medium is possible;
(b) detection means for detecting the plurality of the first extraordinary conditions and a plurality of second extraordinary conditions in which proper data recording on the recording medium is not possible;
(c) display means for displaying detection of one of the second extraordinary conditions by said detection means;
(d) recording means for recording image information on the recording medium; and
(e) means for causing said recording means to record one of the plurality of the display patterns read out of said memory means, upon detection of one of the first extraordinary conditions corresponding to said one of the plurality of the display patterns and for causing said display means to display said detection of one of the second extraordinary conditions, upon detection thereof,
wherein said detection means detects, as the first extraordinary conditions, erroneous operations or troubles which disable continuous transmission of the image information, and detects, as the second extraordinary conditions, absence of the recording medium or improper feeding of the recording medium.

7. A facsimile apparatus comprising:
(a) memory means for storing therein a plurality of display patterns for contents of a plurality of extraordinary conditions;
(b) means for detecting the plurality of extraordinary conditions;
(c) recording means for recording received image information on a recording medium;
(d) display means; and
(e) control means for controlling said display means to display the occurrence of an extraordinary condition when the extraordinary condition is due to said recording means and controlling said recording means to record one of the plurality of display patterns corresponding to the extraordinary condition on the recording medium when the extraordinary condition is not due to said recording means.

8. A facsimile apparatus according to claim 7, wherein said control means also controls said display means to display the occurrence of an extraordinary condition when the extraordinary condition is not due to said recording means.

* * * * *